Figure 4:
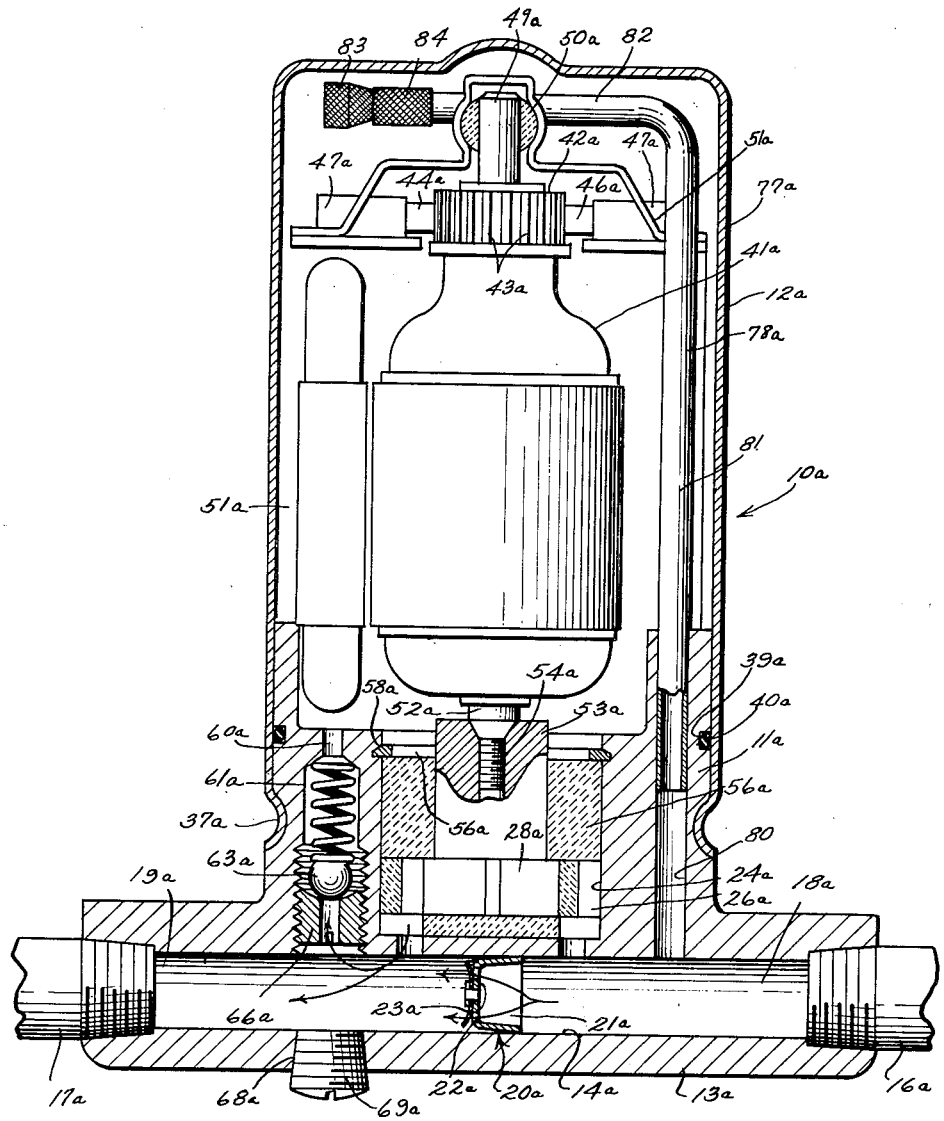

March 24, 1964  W. F. STOERMER  3,126,030
LIQUID COOLED AUXILIARY FUEL PUMP
Filed April 24, 1961  3 Sheets-Sheet 1
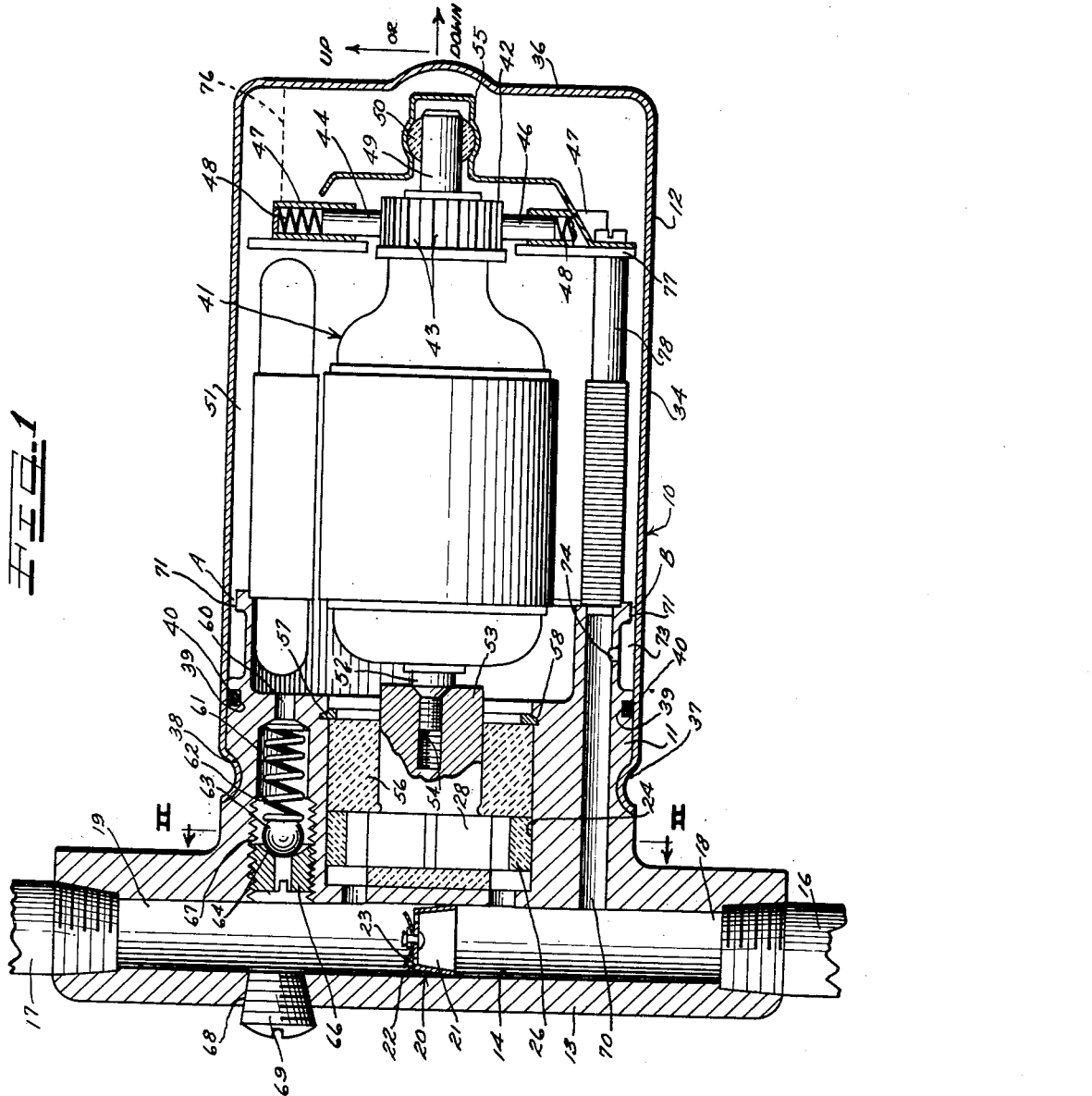
INVENTOR.
WILLIAM F. STOERMER
BY
Hill, Sherman, Meroni, Gross & Simpson
ATTORNEYS March 24, 1964  W. F. STOERMER  3,126,030
LIQUID COOLED AUXILIARY FUEL PUMP
Filed April 24, 1961  3 Sheets-Sheet 2
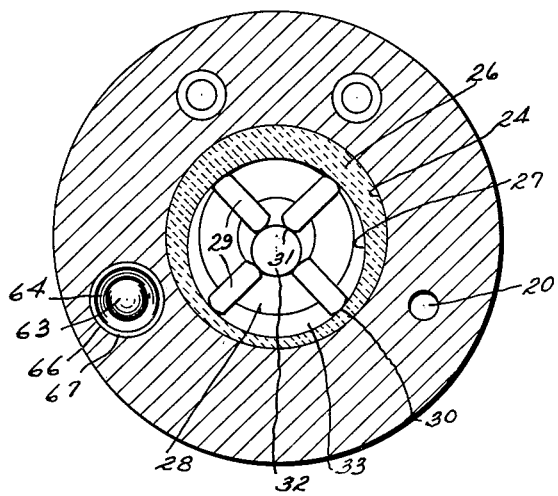
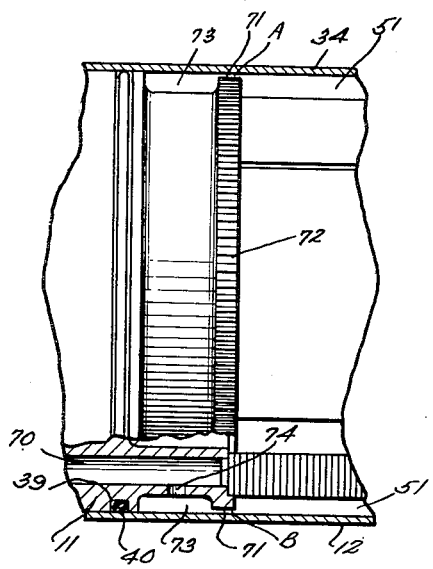
INVENTOR.
WILLIAM F. STOERMER
BY
Hill, Sherman, Meroni, Gross & Simpson
ATTORNEYS March 24, 1964 W. F. STOERMER 3,126,030
LIQUID COOLED AUXILIARY FUEL PUMP
Filed April 24, 1961 3 Sheets-Sheet 3

INVENTOR.
WILLIAM F. STOERMER
BY
Hill, Sherman, Meroni, Gross & Simpson
ATTORNEYS

United States Patent Office 3,126,030
Patented Mar. 24, 1964

3,126,030
LIQUID COOLED AUXILIARY FUEL PUMP
William F. Stoermer, Grafton, Ohio, assignor to Thompson Ramo Wooldridge Inc., Cleveland, Ohio, a corporation of Ohio
Filed Apr. 24, 1961, Ser. No. 105,213
3 Claims. (Cl. 137—569)

This invention relates generally to a pump and more specifically relates to a positive displacement pump which is adapted to be placed in an in-line arrangement for an aircraft fuel system, for example, when used as an auxiliary booster pump and is particularly characterized by a unitary pump package including a direct current driving motor having commutator and brushes subject to arcing when the unit is running with a valve-regulated bypass flow being directed through the motor compartment to cool the motor, the bypass passage being formed with flame-arrester means.

In many prior art fuel pumps, the driving motor is of the alternating current multiple phase induction type and does not have sliding electrical contacts.

The pump of the present invention is particularly useful as a low cost auxiliary fuel pump and is driven by a direct current motor that has commutator and brushes subject to arcing when the unit is running. The pump body incorporates a conduit means providing an inlet for the pump as well as an outlet and the conduit means includes a check valve between the inlet and the outlet, whereby through flow may be accommodated when the pump is out of operation. Shaft seals have been eliminated in favor of a direct coupling between the positive displacement pumping means and the electric motor by enclosing the electric motor in a housing communicating with the pumping fluid. A flow passage having a regulating valve contained therein discharges a portion of the fluid being pumped into the motor compartment and back to the pump inlet, thereby cooling the motor. The return passage from the motor compartment to the pump inlet takes at least two different forms in accordance with the principles of the present invention. In one form of the invention a tube extends through the motor compartment to the opposite side of the motor, thereby insuring the motor compartment is always filled with fluid. A flame-arresting means in the form of a screen is carried on the free end of the tube.

In another form of the invention, the return passage comprises a motor cover and casing fit forming a close fitting annular gap, thereby forming a flame barrier and also providing a means for purging the motor housing of air and vapor.

It is an object of the present invention to provide a low cost auxiliary fuel pump which does not require a rotating shaft seal and which cannot leak due to mechanical wear.

Yet another object of the present invention is to provide a fuel-cooled motor for an auxiliary fuel pump which can be smaller and lighter than a motor operating in air.

Yet another object of the present invention is to provide a pump which can be mounted in an infinite number of positions in regard to port orientation and with the axial center line horizontal.

A still further object of the present invention is to provide a fuel pump which incorporates a direct current type motor having a commutator and brushes which are subject to arcing when the unit is running but which has adequate means for purging the motor of vapors and confining any possible explosion within the motor housing.

Many other features, advantages and additional objects of the present invention will become manifest to those versed in the art upon making reference to the detailed description which follows and the accompanying sheets of drawings in which a preferred structural embodiment of pumping apparatus incorporating the principles of the present invention is shown by way of illustrative example.

On the drawings:
FIGURE 1 is a cross-sectional view of a liquid-cooled auxiliary fuel pump incorporating the principles of the present invention;
FIGURE 2 is a cross-sectional view taken generally on line II—II of FIGURE 1;
FIGURE 3 is a fragmentary view with parts removed and with parts shown in elevation and also with parts broken away illustrating additional details of the pump of FIGURE 1; and
FIGURE 4 is an alternative embodiment of a pump generally similar to the view of FIGURE 1.

As shown on the drawings:
The pump of the present invention is shown generally at 10 and comprises a pump housing means including a pump body 11 as well as a motor housing including a motor cover 12.

Referring first of all to the pump body 11, it will be noted there is provided a conduit means 13 having a through passage extending therethrough as at 14 adapted to receive in coupled connection at opposite ends of the passage 14 a conduit 16 and a conduit 17. Thus, the conduit 16 may be connected to a suitable source of fuel such as the fuel cell of an aircraft and the end of the passageway 14 adjacent the conduit 16 forms an inlet for the pump as at 18. The conduit 17 carries the discharge of the pump and leads to a point of utilization, thereby permitting the end of the passage 14 adjacent the conduit 17 to function as an outlet for the pump as at 19.

Between the inlet 18 and the outlet 19, there is formed a check valve in the passage 14 shown generally at 20. The check valve 20 comprises a cup-shaped bracket 21 having a wall with openings 22 formed therein closed by a flexible valve member 23 in response to pressure in the outlet 19. When the pump 10 is not in operation, however, a through flow may be accommodated from the inlet 18 to the outlet 19 via the passage 14 and the conduit means 13 since the fuel will flow through the openings 22 and past the flexible valve member 23.

As shown in FIGURES 1 and 2, the pump body 11 has adjacent the conduit means 13 a body portion forming a pumping chamber 24.

In this particular embodiment, the pump utilizes a rotary positive displacement pumping means. Accordingly, within the pumping chamber 24 there is positioned a stationary ring 26 having formed therein an eccentrically offset bore 27 in which is rotated a ring 28 carrying a plurality of vaned pumping elements 29 of the sliding vane type. The outer ends of the vanes 29, as at 30, follow the adjoining bore wall 27 of the ring 26, while the inner ends of the vanes 29, as at 31, are engaged against a center shaft 32.

The ring 28 is a lesser diameter than the eccentrically offset bore 27, thereby leaving a crescent-shaped working area 33 through which the vanes 29 move in positively displacing fluid from the inlet 18 to the outlet 19.

Although other geometrical shapes could be effectively utilized, the pump body has a cylindrical portion which is embraced by a correspondingly cylindrically shaped motor cover 12, the motor cover 12 comprising a can-shaped member having circumferentially continuous side walls 34 and an end wall 36.

Adjacent the end of the side walls 34, there is an inwardly embossed portion 37 which engages a correspondingly shaped recess 38 formed in the pump body 11, thereby assisting in locking the motor cover 12 to the pump body 11. The pump body 11 is also recessed as at 39 to receive an O ring sealing member 40 which engages against the inner portions of the side walls 34 and placing the pump body 11 and the motor cover 12 in sealed assembly with one another.

In order to provide a low cost drive for the pump 10, it is contemplated by the present invention to utilize a series or universal type direct current motor 41. With such motor there is provided a commutator 42 having a plurality of circumferentially spaced segments 43 engaged by a pair of brushes shown at 44 and 46 each carried in a brush holder 47 and continuously biased into engagement with the commutator 42 by means of a coil spring 48. The commutator 42 is mounted on a shaft 49 journaled in a bearing 50 carried by a mounting bracket 55.

The direct current motor 41 is completely enclosed by the motor cover 12 which together with the pump body 11 forms a motor compartment 51. At the end of the motor 41 opposite the bearing 50, there is provided a rotatable driving shaft 52 to which is attached a sealless coupling 53 directly connected to the ring 28 and the shaft 32. For example, a convenient way of effecting such seal-less direct coupling is to provide a unitary rotor assembly wherein the part identified at 53 comprises an axial extension of the rotor having a coupling connection as at 54 with the shaft 52 and being centered and supported by an annular bearing 56 retained by a snap ring 57 received in a recess 58 formed in the pump body 11.

In accordance with the principles of the present invention, a passage 60 extends between the motor compartment 51 and the outlet 19. Thus, the passage 60 is counterbored as at 61 to accommodate a coil spring 62 which continuously biases a ball valve member 63 against a valve seat 64 formed in a bushing 66 which is externally threaded for threaded assembly in a correspondingly threaded portion 67 of the passage 60.

Proper selection of the spring 62 and positioning of the bushing 66 permits the valve 63 to operate as a regulating valve. Accordingly, excess fluid will be bypassed through the passage 60 by the valve 63 into the motor compartment 51.

To facilitate access to the bushing 66 for adjustment thereof, an opening 68 is formed in register with the passage 60 which is normally closed by a plug 69.

A return passage is formed between the inlet 18 and the motor compartment 51. A portion of the passage as at 70 is directly formed within the pump body 11. It will be noted, however, that the motor cover 12 and pump body 11 fit forms a close fitting annular gap 71 through which the bypassed fuel must flow on its return to the pump inlet 18. This gap 71 is controlled so that the flame from an explosion in the motor compartment 51 will not propagate into the inlet line. For example, the dimensions of the gap are controlled within a range of approximately .005 to .010 inch and, as shown in FIGURE 3, the cylindrical pump body 11 is provided adjacent the gap with a knurled peripheral surface 72 which assists in forming the restricted flow passage 71.

In addition to the function of the gap 71 as a flame barrier, it also provides a means for purging the motor housing of air or vapor, or both. In this connection, it will be noted that the pump housing 11 is recessed, thereby forming between the respective pump and motor housing means an enlarged annular passage 73 into which the annular gap 71 discharges. The annular passage 73 is connected to the passage 70 by means of an opening 74.

When the motor compartment 51 is full of fuel, the pressure drop across the annular gap 71 is uniform over its total circumference. However, if a pocket of trapped air or vapor is present when the unit is started, the pressure drop will not develop and the air will then be expelled into the annular passage 73 at portions of the gap 71 indicated at A before a significant amount of fuel will flow at portions of the gap 71 indicated at B. In this connection, the orientation of the unit shown in FIGURE 1 depicts a fuel level in dashed lines as shown at 76 since it is assumed the axial center line of the pump is mounted in a horizontal position, thereby leaving an air pocket above the level of the fuel, as shown at 76.

The bracket 55 is shown connected to a mounting frame 77 which, in turn, is fastened in firm assembly to the pump body 11 by appropriate fastening means 78. The pump arrangement thus shown in FIGURES 1, 2 and 3 can be mounted in an infinite number of positions in regard to port orientation with the axial center line horizontal. Mounting positions with the center line other than horizontal are also possible providing that the motor is below the pump. These characteristics have been depicted in FIGURE 1 by the arrows and legends "up or down" on the right-hand side of FIGURE 1.

In the form of the invention illustrated in FIGURE 4, the pump and motor combination is very similar to the pump and motor combination already described in connection with FIGURES 1, 2 and 3. Where possible like reference numerals have been applied to like parts but with the suffix "a." The return line, however, from the motor compartment 51a to the inlet 18a takes the form in FIGURE 4 of a tube which extends through a passage 80 formed in the pump body 11a. The tube is shown at 81 and extends completely through the motor compartment 51a, having a major leg terminating in a minor leg 82 disposed on the side of the motor 41a opposite the pump body 11a and opening into the motor compartment 51a in spaced relation to the passage 60a, thereby to insure that the motor housing is always filled with fuel.

A flame-arresting means is also provided in this form of the invention, however, with the tube 81, 82, the flame-arresting means takes the form of a screen 83 fastened on the end of the minor leg 82 of the tube 81 by means of a coupling member 84.

In operation, the regulator valve 63a controls the pressure of the positive displacement vane pump regardless of flow through the bypassing of fuel through the motor compartment 51a, thus cooling the motor 41a as the fuel flows back to the inlet 18a. The vapor tube 81 is so located that the motor compartment is always full of fuel and vapor is permitted to be forced out, thereby precluding overheating of the motor through vapor build-up.

Although minor modifications might be suggested by those versed in the art, it should be understood that I wish to embody within the scope of the patent warranted hereon all such modifications as reasonably and properly come within the scope of my contribution to the art.

I claim as my invention:
1. A pump comprising
   a casing having a generally cylindrical body portion and having laterally extending boss portions at one end thereof, a conduit means defining a straight line passage extending through said body portion and said boss portions and having an inlet and an outlet disposed in coaxial line with one another at opposite ends of said passage and including means to receive conduit members in coupled connection therewith,
   a check valve in said passage between said inlet and said outlet,
   whereby through flow through said passage may be accommodated when the pump is out of operation,
   said body portion of said casing having formed therein a pumping chamber spaced adjacent said conduit means and having means communicating said pumping chamber with said passage on opposite sides of said check valve,
   positive displacement rotary pumping means in said pumping chamber for moving fluid from said inlet at increased pressure to said outlet,
   a can-shaped motor cover having circumferential side walls connected to said casing and forming therewith a motor compartment,
   a direct current motor in said compartment having a commutator and brush means for electrically energizing the motor from a source of direct current,
said motor having a rotatable shaft and a direct seal-less coupling connection to said pumping means,
a passage formed in said casing extending from the interior of said motor compartment and intersecting said straight line passage on the outlet side of said check valve,
said passage being counterbored to form a spring bottoming shoulder therein,
a control spring in said passage having one end bottomed against said spring bottoming shoulder,
a movable valve element in said passage bottomed against the other end of said spring, an apertured bushing having a valve seat formed therein,
said bushing and the walls of said passage having screw threads for adjustably threading said bushing against the spring biased valve element, thereby to form a regulating valve in said passage,
said boss means having formed therein an access opening in register with said passage but on the opposite side of said straight line passage,
a removable plug in said access opening,
whereby access to said bushing for adjustment of the bypass flow rate is facilitated,
said valve operating to regulate the pressure of the pump by directing excess flow into said motor cover,
and means forming a return passage extending from said motor compartment and intersecting said straight line passage on the inlet side of said check valve,
whereby fluid bypassing through said motor compartment will cool the motor,
and flame-arresting means in said return passage.

2. A pump as defined in claim 1, said flame-arresting means comprising a close fitting annular gap between said body portion of said casing and said motor cover and forming a part of said return passage.

3. A pump as defined in claim 1, said flame-arresting means comprising a tube connected to said casing and extending into said motor compartment to form part of said return passage and having a screen at the end thereof.

References Cited in the file of this patent
UNITED STATES PATENTS

| | | |
|---|---|---|
| 1,765,490 | Janette | June 24, 1930 |
| 1,889,517 | Roessler | Nov. 29, 1932 |
| 2,189,210 | Johnson | Feb. 6, 1940 |
| 2,510,632 | Hemphill | June 6, 1950 |
| 2,741,990 | White | Apr. 17, 1956 |
| 2,885,962 | Campbell | May 12, 1959 |
| 2,965,038 | Purden et al. | Dec. 20, 1960 |

FOREIGN PATENTS

| | | |
|---|---|---|
| 682,295 | France | Feb. 11, 1930 |
| 788,955 | France | Aug. 5, 1935 |
| 143,324 | Switzerland | Jan. 16, 1931 |